US012661641B2

(12) United States Patent
Zhao et al.

(10) Patent No.: US 12,661,641 B2
(45) Date of Patent: Jun. 23, 2026

(54) PRECIOUS METAL LOADED COVALENT ORGANIC FRAMEWORK COMPOSITE MATERIAL AND PREPARATION METHOD THEREFOR

(71) Applicant: GUANGDONG INSTITUTE OF ECO-ENVIRONMENT AND SOIL SCIENCES, Guangzhou (CN)

(72) Inventors: Xiaoli Zhao, Beijing (CN); Lin Niu, Beijing (CN); Fengchang Wu, Beijing (CN); Qitao Lei, Beijing (CN)

(73) Assignee: GUANGDONG INSTITUTE OF ECO-ENVIRONMENT AND SOIL SCIENCES, Guangzhou (CN)

( * ) Notice: Subject to any disclaimer, the term of this patent is extended or adjusted under 35 U.S.C. 154(b) by 529 days.

(21) Appl. No.: 18/135,201

(22) Filed: Apr. 17, 2023

(65) Prior Publication Data

US 2023/0264182 A1 Aug. 24, 2023

Related U.S. Application Data

(63) Continuation of application No. PCT/CN2022/102131, filed on Jun. 29, 2022.

(30) Foreign Application Priority Data

Jun. 29, 2021 (CN) .......................... 202110731539.4

(51) Int. Cl.
| | |
|---|---|
| *B01J 31/06* | (2006.01) |
| *B01J 35/00* | (2024.01) |
| *B01J 35/30* | (2024.01) |
| *B01J 35/45* | (2024.01) |
| *B01J 37/00* | (2006.01) |
| *B01J 37/04* | (2006.01) |
| *C02F 1/70* | (2023.01) |
| *C02F 101/34* | (2006.01) |
| *C02F 101/38* | (2006.01) |

(52) U.S. Cl.
CPC ............. *B01J 31/06* (2013.01); *B01J 35/393* (2024.01); *B01J 35/45* (2024.01); *B01J 37/0063* (2013.01); *B01J 37/04* (2013.01); *C02F 1/70* (2013.01); *B01J 2235/00* (2024.01); *B01J 2235/10* (2024.01); *B01J 2235/15* (2024.01); *B01J 2235/30* (2024.01); *C02F 2101/345* (2013.01); *C02F 2101/38* (2013.01)

(58) Field of Classification Search
CPC . B01J 31/06; B01J 35/45; B01J 35/393; B01J 37/0063; B01J 37/04; C02F 1/70
See application file for complete search history.

(56) References Cited

FOREIGN PATENT DOCUMENTS

| | | | |
|---|---|---|---|
| CN | 108192057 A | 6/2018 | |
| CN | 109232588 A | 1/2019 | |
| CN | 113004532 A | * 6/2021 | ............... G02B 1/04 |

OTHER PUBLICATIONS

Liu et al., Chem. Commun., (2019), v.55, p. 167-170.*
International Search Report of PCT Patent Application No. PCT/CN2022/102131 issued on Sep. 14, 2022.
Pradip Pachfule et al., Highly Stable Covalent Organic Framework-Au Nanoparticles Hybrids for Enhanced Activity for Nitrophenol Reduction, ChemComm, Jan. 7, 2014, pp. 3169-3172, vol. 50, No. 24, Royal Society of Chemistry.
Lin Niu et al., Solid-Solid Reaction Synthesis of Covalent Organic Framework as a Stable and Highly Active Photo-Catalyst for Degradation of Sulfathiazole in Industrial Wastewater, Chemical Engineering Journal, Jan. 22, 2021, pp. 128619(2), vol. 414, Elsevier.
Lin Niu et al., Solid-Solid Synthesis of Covalent Organic Framework as a Support for Growth of Controllable Ultrafine Au Nanoparticles, Science of the Total Environment, Apr. 22, 2022, pp. 155423(2), vol. 835, Elsevier.
Lin Niu, Ball Milling Synthesis of Covalent Organic Framework and Catalytic Performance, Engineering Science & Technology 1, China Doctoral Dissertations/Master's Theses Tull-Text Database (Master), Feb. 15, 2022, Chapter 3.

* cited by examiner

*Primary Examiner* — Yong L Chu

(57) ABSTRACT

The application belongs to the field of material preparation and environments, and specifically, to a precious metal loaded Covalent Organic Framework (COF) composite material and a preparation method therefor. The components of the composite material include precious metal nanoparticles and TpMA. The preparation method includes first mixing the TpMA, chloroauric acid and methanol; and then adding sodium borohydride for reaction, so as to obtain the composite material. The precious metal nanoparticle loaded COF material prepared in the application may be used as a catalyst, which is a novel heterogeneous catalyst with simple, green and efficient preparation; and the material is high in catalytic activity, fast in degradation rate and short in time, and may catalyze the reduction of high concentration pollutants.

5 Claims, 5 Drawing Sheets

PRECIOUS METAL LOADED COVALENT ORGANIC FRAMEWORK COMPOSITE MATERIAL AND PREPARATION METHOD THEREFOR

CROSS-REFERENCE TO RELATED APPLICATIONS

The present application is a continuation application of PCT application No. PCT/CN2022/102131 filed on Jun. 29, 2022, which claims the benefit of Chinese Patent Application No. 202110731539.4 filed on Jun. 29, 2021. The contents of all of the aforementioned applications are incorporated by reference herein in their entirety.

TECHNICAL FIELD

The application belongs to the field of material preparation and environments, and specifically, to a precious metal loaded Covalent Organic Framework (COF) composite material and a preparation method therefor.

BACKGROUND

Nitro compounds are common organic pollutants in industrial wastewater; and 4-nitrophenol is widely used as a typical nitro pollutant in industries such as dyestuff, paper-making, pharmaceuticals, pesticides and petroleum, and is also a chemical precursor of 4-aminophenol. The 4-nitrophenol is hazardous to plants and animals, and may cause headaches, nausea and drowsiness in humans with short-term exposure. The 4-nitrophenol is listed by the U.S. Environmental Protection Agency as one of 114 organic pollutants, with a maximum allowable level of 0.43 $\mu$mol/L in drinking water. Among various methods such as adsorption, membrane separation, solvent extraction and catalytic reduction, catalytic reduction based on precious metal nanoparticles is considered as one of the cost-effective methods.

Due to the unique photoelectric and physicochemical properties of the precious metal nanoparticles, the precious metal nanoparticles are widely used in the fields of catalysis, energy, electrochemistry, and antisepsis. In particular, precious metal nanoparticles with high surface-to-volume ratio and specific surface area, such as gold nanoparticles (Au NPs), platinum nanoparticles (Pt NPs), and palladium metal nanoparticles (Pd NPs), show high catalytic activity, stability, and recyclability in terms of multiphase catalysis. However, individual precious metal nanoparticles are highly prone to agglomeration due to high specific surface energy, easily leading to the reduction of catalytic activity during a catalytic process, thus affecting the recovery and reusability of catalysts. Therefore, in order to improve the dispersion of the precious metal nanoparticles, loading the precious metal nanoparticles on porous matrices is an important strategy to avoid agglomeration of metal nanoparticles.

Because of an excellent crystal structure and morphology of COFs prepared by a solvothermal method, the solvothermal method is one of the most commonly used methods to prepare the COFs. However, the experimental conditions of the solvothermal method are relatively demanding, such as the need for high temperatures (85-120° C.), long preparation time (usually lasting 2-9 d), high consumption of organic solvents, and many operational steps. These stringent experimental conditions limit the industrial application of the solvothermal method. Therefore, there is a need to find a clean, convenient and efficient preparation method. At present, a variety of preparation methods, such as an ionothermal method, a microwave-assisted method, an interfacial synthesis method, and a mechanical grinding method, have been developed. Compared to the solvothermal method, the mechanical grinding method, which is also known as a mechanochemical method, has the advantages of being cleaner, more efficient and simpler. However, no study has reported the preparation of the COFs for loading the precious metal nanoparticles by means of the mechanical grinding method.

In recent years, the study of COF materials as precious metal matrix materials has received much attention. PtNPs@COF and PdNPs@COF are prepared by using the COFs containing thioether, such as Lu, as growth templates for the precious metal nanoparticles (Pt NPs and Pd NPs). Thioether functional groups may be used as nucleation sites for metal deposition and particle growth, so as to achieve growth control of the sizes of the precious metal nanoparticles. PtNPs@COF and PdNPs@COF catalysts show excellent catalytic activities for a Suzuki-Miyaura coupling reaction and a nitrophenol reduction reaction.

When precious metals are loaded on the surface of a COF material, catalytic application is reduced due to the large particle size of the precious metal nanoparticles, and in addition, the precious metal nanoparticles are highly prone to agglomeration due to large surface energy, resulting in the decrease of catalytic activity. How to effectively balance the particle size and content of the precious metal nanoparticles is a difficult problem in current research. In addition, strong reducing agents are required in the preparation of the precious metal nanoparticles, placing higher requirements on the stability and corrosion resistance of carriers. How to select a stable and strong COF material as the carrier of the precious metal nanoparticles and ensure that the precious metal nanoparticles do not damage their own structural frameworks when the precious metal nanoparticles are embedded inside the COF material is another difficult problem to overcome.

SUMMARY

In view of differences in the related art, the application provides a precious metal loaded COF composite material and a preparation method therefor. The prepared precious metal nanoparticle loaded COF material may be used as a catalyst, which is a novel heterogeneous catalyst with simple, green and efficient preparation; and the material is high in catalytic activity, fast in degradation rate and short in time, and may catalyze the reduction of high concentration pollutants.

The objective of the application is implemented by means of the following technical solutions.

The components of a precious metal loaded COF composite material include precious metal nanoparticles and TpMA.

Preferably, the precious metal nanoparticles are one of Au NPs, silver nanoparticles (Ag NPs) or Pt NPs, preferably the Au NPs.

Preferably, raw materials for preparing the composite material include TpMA and chloroauric acid (HAuCl$_4$); and a mass ratio of the TpMA to the HAuCl$_4$ is 10:1-5.

Another objective of the application provides a method for preparing a precious metal loaded COF composite material. The method includes the following steps.

(1) TpMA, HAuCl$_4$ and methanol are mixed, and stirring is performed at room temperature.

(2) Sodium borohydride (NaBH$_4$) is added in a reaction system of step (1), and reaction is performed for 1-3 h, so as to obtain the precious metal loaded COF composite material.

Preferably, a mass ratio of the TpMA, the HAuCl$_4$ and the methanol in step (1) is 10:1-5:0.5-1.5.

Preferably, the time for stirring in step (1) is more than 20 h, preferably 24-26 h, and more preferably 24 h.

Preferably, a mass mole ratio of the HAuCl$_4$ and the methanol is 1-5:0.4 g/mol; and the concentration of the NaBH$_4$ is 1.5-2.5 mol/L.

Preferably, the reaction in step (2) is performed for 1-3 h; after the reaction is completed, dichloromethane is first used for washing; then the methanol is used for washing; and finally, vacuum drying is performed at 60-70° C., so as to obtained the precious metal loaded covalent organic framework composite material.

Preferably, a method for preparing the TpMA in step (1) includes the following steps.

A, p-toluenesulfonic acid and melamine are first mixed, and ground for 12-30 min.

B, then 1,3,5-triformyl phloroglucinol is added into the reaction system of step (1), and grinding is performed for 2-4 h.

C, finally 0.1-0.5 mL of water is added into the reaction system of step (2), grinding is performed, DMF is used for washing for 2-3 times, and vacuum drying is performed, so as to obtain the TpMA.

Preferably, a using amount ratio of the p-toluenesulfonic acid, the melamine and the 1,3,5-triformyl phloroglucinol is 0.5-1.5 mL:320-360 mg:370-390 mg.

Preferably, the time for grinding in step C is 4-6 h; and the temperature of vacuum drying is 55-65° C.

The application is further intended to provide an application of the precious metal loaded COF composite material in adsorption, catalysis and degradation of pollutants.

The application has the following beneficial effects.

1) By means of the TpMA loaded COF material prepared in the application, the particle sizes and content of the precious metal nanoparticles loaded on the surface of the COF material are effectively balanced, superfine precious metal nanoparticles (<5 nm) are synthesized, and the disadvantages of the nanoparticles highly prone to agglomeration are overcome, such that catalytic performance is greatly improved.

2) The TpMA COF material prepared in the application is excellent in stability, and provides, as a porous organic material, stable structural support for the loading of Au NPs, such that the Au NPs is well dispersed and stably exists in the TpMA. In addition to this, the structure of a COF will not be damaged due to the embedding of the Au NPs.

3) The partical size and density of the Au NPs in an Au@TpMA catalyst may be automatically adjusted by controlling the using amount of HAuCl$_4$. The optimal using amount of the HAuCl$_4$ is discovered through studies.

4) In the application, when the TpMA COF material is prepared, an in-depth study is performed on the reaction. The p-toluenesulfonic acid and the melamine are first mixed to generate a protonation reaction, so as to form p-toluene-sulfonic acid-amine salt as the template of the reaction; then the 1,3,5-triformyl phloroglucinol is added, to generate a deprotonation process and a condensation reaction based on the melamine and the 1,3,5-triformyl phloroglucinol; and finally, the Covalent Organic Framework (COF) material is formed with excellent stability.

DETAILED DESCRIPTION OF THE EMBODIMENTS

Figure 1:
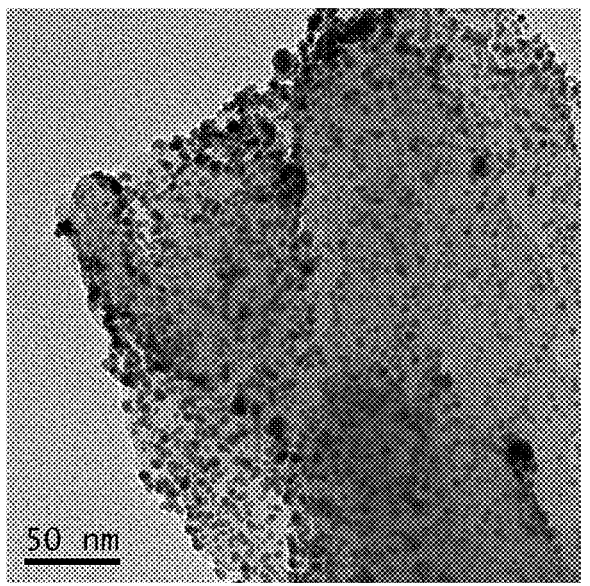
FIG. 1 is a TEM diagram of Au@TpMA prepared in Embodiment 1.
Figure 2:
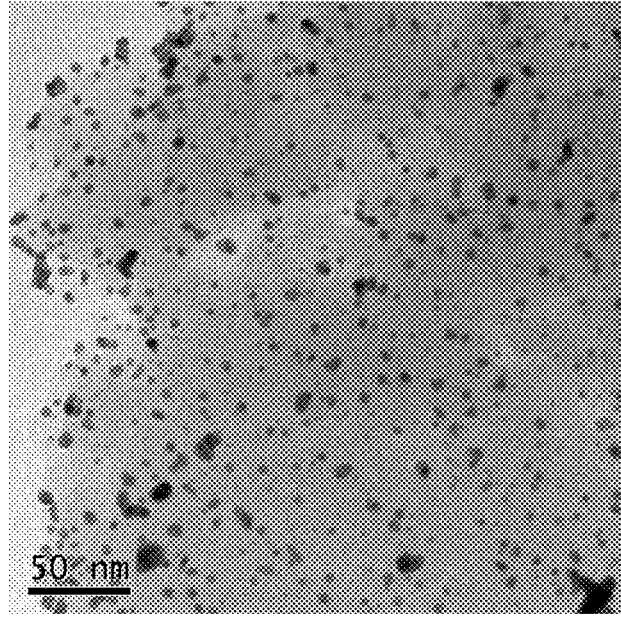
FIG. 2 is a TEM diagram of Au@TpMA prepared in Embodiment 2.
Figure 3:
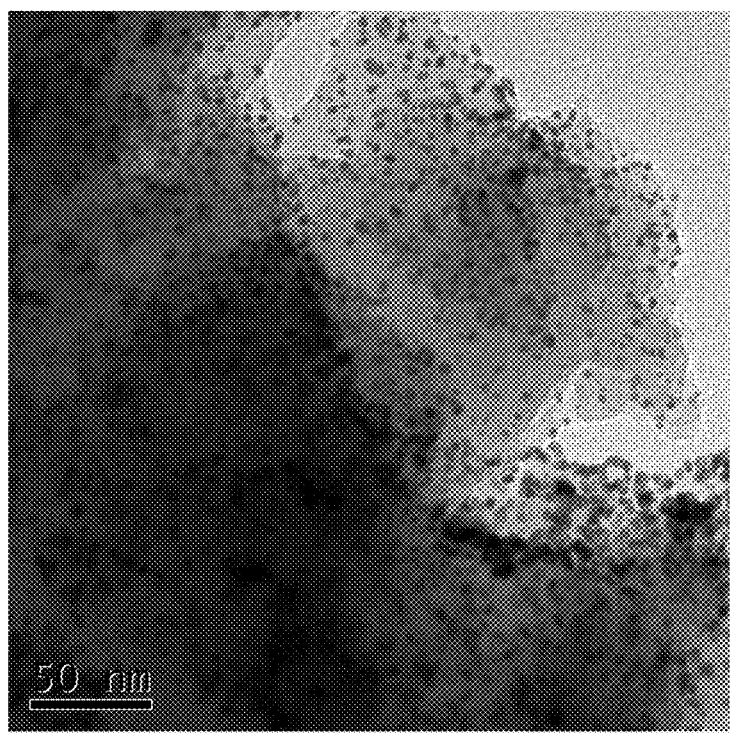
FIG. 3 is a TEM diagram of Au@TpMA prepared in Embodiment 3.
Figure 4:
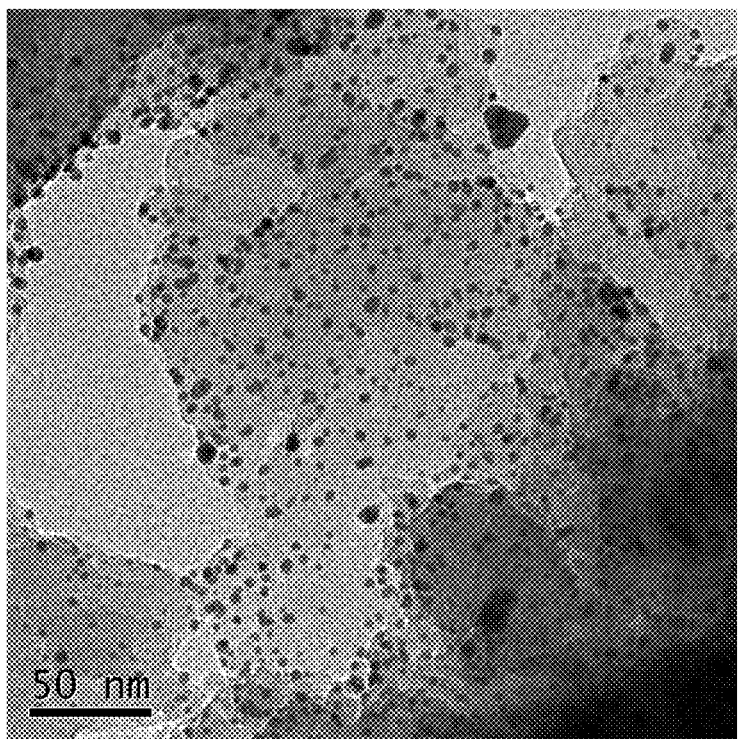
FIG. 4 is a TEM diagram of Au@TpMA prepared in Embodiment 4.
Figure 5:
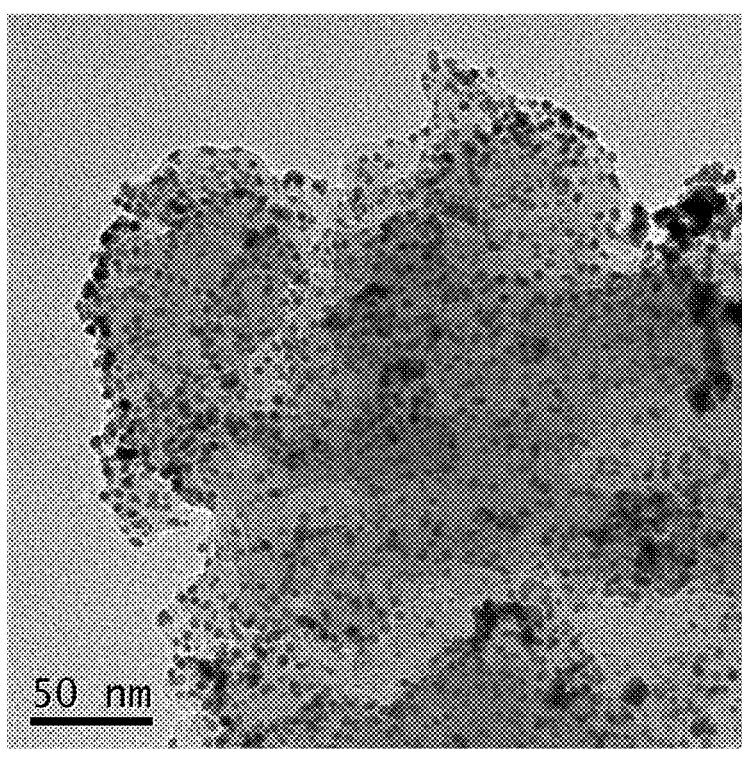
FIG. 5 is a TEM diagram of Au@TpMA prepared in Embodiment 5.

The application is further described below with reference to the specific embodiments.

Embodiment 1

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1 mL of a p-toluenesulfonic acid catalyst and 340 mg of melamine (MA) are added to the grinding jar; and then the mixture is ground for 15 min at 300 rpm.

(2) 378 mg of 1,3,5-triformyl phloroglucinol (TP) is added to the mixture, and grinding is continued for 2.75 h by means of kinetic energy between the mill balls and the grinding jar; and then 0.5 mL of water is added to the mixture, and grinding is performed for 5 h.

(3) DMF is used for washing for 2 times; then vacuum drying is performed at 60° C.; and TpMA is collected.

2) Method for Preparing Au NPs Loaded COF Material (1) 100 mg of the TpMA (which is prepared by means of ball milling) and 40 mg of HAuCl$_4$ are weighed and placed in a beaker; 10 mL of methanol is added; and stirring is performed for 24 h at room temperature.

(2) A prepared NaBH$_4$ solution (2 mL, 2 mol/L) is added to the above mixed solution; and stirring is continued for 2 h.

(3) Dichloromethane and the methanol are used for washing; vacuum drying is performed (65° C.); and a catalyst (Au@TpMA) is collected. The partical size of Au in the catalyst Au@TpMA is 3.09±0.75 nm.

Embodiment 2

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1.5 mL of a p-toluenesulfonic acid catalyst and 360 mg of melamine (MA) are added to the grinding jar; and then the mixture is ground for 30 min at 300 rpm.

(2) 390 mg of 1,3,5-triformyl phloroglucinol (TP) is added to the mixture, and grinding is continued for 2.75 h by means of kinetic energy between the mill balls and the grinding jar; and then 0.2 mL of water is added to the mixture, and grinding is performed for 6 h.

(3) DMF is used for washing for 3 times; then vacuum drying is performed at 65° C.; and TpMA is collected.

2) Method for Preparing Au NPs Loaded COF Material (1) 100 mg of the TpMA (which is prepared by means of ball milling) and 10 mg of $HAuCl_4$ are weighed and placed in a beaker; 8 mL of methanol is added; and stirring is performed for 22 h at room temperature.

(2) A prepared $NaBH_4$ solution (3 mL, 1.5 mol/L) is added to the above mixed solution; and stirring is continued for 1 h.

(3) Dichloromethane and the methanol are used for washing; vacuum drying is performed (65° C.); and a catalyst (Au@TpMA) is collected for later use. The partical size of Au in the catalyst Au@TpMA is 4.32±1.39 nm.

Embodiment 3

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 0.5 mL of a p-toluenesulfonic acid catalyst and 320 mg of melamine (MA) are added to the grinding jar; and then the mixture is ground for 12 min at 300 rpm.

(2) 370 mg of 1,3,5-triformyl phloroglucinol (TP) is added to the mixture, and grinding is continued for 2 h by means of kinetic energy between the mill balls and the grinding jar; and then, 0.5 mL of water is added to the mixture, and grinding is performed for 4 h.

(3) DMF is used for washing for 2 times; then vacuum drying is performed at 55° C.; and TpMA is collected.

2) Method for Preparing Au NPs Loaded COF Material (1) 100 mg of the TpMA (which is prepared by means of ball milling) and 50 mg of $HAuCl_4$ are weighed and placed in a beaker; 16 mL of methanol is added; and stirring is performed for 26 h at room temperature.

(2) A prepared $NaBH_4$ solution (2 mL, 2.5 mol/L) is added to the above mixed solution; and stirring is continued for 3 h.

(3) Dichloromethane and the methanol are used for washing; vacuum drying is performed (65° C.); and a catalyst (Au@TpMA) is collected for later use. The partical size of Au in the catalyst Au@TpMA is 2.50±0.55 nm.

Embodiment 4

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1 mL of a p-toluenesulfonic acid catalyst and 340 mg of melamine (MA) are added to the grinding jar; and then the mixture is ground for 15 min at 300 rpm.

(2) 378 mg of 1,3,5-triformyl phloroglucinol (TP) is added to the mixture, and grinding is continued for 2.75 h by means of kinetic energy between the mill balls and the grinding jar; and then 0.3 mL of water is added to the mixture, and grinding is performed for 5 h.

(3) DMF is used for washing for 2 times; then vacuum drying is performed at 60° C.; and TpMA is collected.

2) Method for Preparing Au NPs Loaded COF Material (1) 100 mg of the TpMA (which is prepared by means of ball milling) and 20 mg of $HAuCl_4$ are weighed and placed in a beaker; 10 mL of methanol is added; and stirring is performed for 24 h at room temperature.

(2) A prepared $NaBH_4$ solution (2 mL, 2 mol/L) is added to the above mixed solution; and stirring is continued for 2 h.

(3) Dichloromethane and the methanol are used for washing; vacuum drying is performed (65° C.); and a catalyst (Au@TpMA) is collected for later use. The partical size of Au in the catalyst Au@TpMA is 3.43±0.87 nm.

Embodiment 5

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1 mL of a p-toluenesulfonic acid catalyst and 340 mg of melamine (MA) are added to the grinding jar; and then the mixture is ground for 15 min at 300 rpm.

(2) 378 mg of 1,3,5-triformyl phloroglucinol (TP) is added to the mixture, and grinding is continued for 2.75 h by means of kinetic energy between the mill balls and the grinding jar; and then, 0.5 mL of water is added to the mixture, and grinding is performed for 5 h.

(3) DMF is used for washing for 2 times; then vacuum drying is performed at 60° C.; and TpMA is collected.

2) Method for Preparing Au NPs Loaded COF Material (1) 100 mg of the TpMA (which is prepared by means of ball milling) and 33 mg of $HAuCl_4$ are weighed and placed in a beaker; 10 mL of methanol is added; and stirring is performed for 24 h at room temperature.

(2) A prepared $NaBH_4$ solution (2 mL, 2 mol/L) is added to the above mixed solution; and stirring is continued for 2 h.

(3) Dichloromethane and the methanol are used for washing; vacuum drying is performed (65° C.); and a catalyst (Au@TpMA) is collected for later use. The partical size of Au in the catalyst Au@ TpMA is 3.24±0.69 nm.

Embodiment 6

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1 mL of a p-toluenesulfonic acid catalyst and 340 mg of melamine (MA) are added to the grinding jar; and then the mixture is ground for 15 min at 300 rpm.

(2) 378 mg of 1,3,5-triformyl phloroglucinol (TP) is added to the mixture, and grinding is continued for 2.75 h by means of kinetic energy between the mill balls and the grinding jar; and then, 0.5 mL of water is added to the mixture, and grinding is performed for 5 h.

(3) DMF is used for washing for 2 times; then vacuum drying is performed at 60° C.; and TpMA is collected.

2) Method for Preparing Silver Nanoparticles (Ag NPs) Loaded COF Material (1) 100 mg of the TpMA prepared by means of grinding, and 17.98 mg of silver nitrate ($AgNO_3$) are placed in a 30 mL methanol solution, and are mixed and stirred for 24 h in the dark.

(2) $NaBH_4$ (2 mol/L, 2 mL) is added, and stirring is continued for 2 h.

(3) Then, precipitates are collected; dichloromethane and ultrapure water are used for washing for 2 times; and vacuum drying is performed (65° C.), so as to obtain the material. The partical size of Ag in a catalyst Ag@TpMA is 3.24±0.64 nm.

Comparative Example 1

The difference between this comparative example and Embodiment 1 lies in that the using amount of $HAuCl_4$ is different. Specific operations are as follows.

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1 mL of a p-toluenesulfonic acid catalyst and 340 mg of melamine (MA) are added to the grinding jar; and then the mixture is ground for 15 min at 300 rpm.

(2) 378 mg of 1,3,5-triformyl phloroglucinol (TP) is added to the mixture, and grinding is continued for 2.75 h by means of kinetic energy between the mill balls and the grinding jar; and then 0.5 mL of water is added to the mixture, and grinding is performed for 5 h.

(3) DMF is used for washing for 2 times; then vacuum drying is performed at 60° C.; and TpMA is collected.

2) Method for Preparing Au NPs Loaded COF Material (1) 100 mg of the TpMA (which is prepared by means of ball milling) and 60 mg of $HAuCl_4$ are weighed and placed in a beaker; 10 mL of methanol is added; and stirring is performed for 24 h at room temperature.

(2) A prepared $NaBH_4$ solution (2 mL, 2 mol/L) is added to the above mixed solution; and stirring is continued for 2 h.

(3) Dichloromethane and the methanol are used for washing; vacuum drying is performed (65° C.); and a catalyst (Au@TpMA) is collected for later use.

The partical size of Au in the catalyst Au@TpMA is 2.97±0.68 nm. When the concentration of the $HAuCl_4$ is high, although the partical size of the prepared catalyst Au@TpMA is small, agglomeration easily occurs, such that the catalyst is poor in catalytic effect.

Comparative Example 2

The difference between this comparative example and Embodiment 1 lies in that the using amount and concentration of $NaBH_4$ are different. Specific operations are as follows.

1) Method for Preparing COF Material TpMA

A planetary ball mill (AM400, Ant Source Scientific Instruments (Beijing) Co., Ltd., at Beijing, China) is used. The method includes the following specific steps.

(1) 5 mill balls with the diameter being 5 mm and 15 mill balls with the diameter being 7 mm are added to a 50 mL zirconia grinding jar; 1 mL of a p-toluenesulfonic acid catalyst and 340 mg of melamine (MA) are added to the grinding jar; and then the mixture is ground for 15 min at 300 rpm.

(2) 378 mg of 1,3,5-triformyl phloroglucinol (TP) is added to the mixture, and grinding is continued for 2.75 h by means of kinetic energy between the mill balls and the grinding jar; and then, 0.5 mL of water is added to the mixture, and grinding is performed for 5 h.

(3) DMF is used for washing for 2 times; then vacuum drying is performed at 60° C.; and TpMA is collected.

2) Method for Preparing Au NPs Loaded COF Material (1) 100 mg of the TpMA (which is prepared by means of ball milling) and 40 mg of $HAuCl_4$ are weighed and placed in a beaker; 10 mL of methanol is added; and stirring is performed for 24 h at room temperature.

(2) A prepared $NaBH_4$ solution (1 mL, 3 mol/L) is added to the above mixed solution; and stirring is continued for 2 h.

(3) Dichloromethane and the methanol are used for washing; vacuum drying is performed (65° C.); and a catalyst (Au@TpMA) is collected for later use. The partical size of the catalyst Au@ TpMA is 3.50±0.62 nm.

Comparative Example 3

The difference between this comparative example and Embodiment 1 lies in that the method for preparing a COF material TpMA is different. Specific operations are as follows.

1) Method for Preparing of COF Material TpMA

A planetary ball mill (AM400, Ant Source Scientific Instruments (Beijing) Co., Ltd., at Beijing, China) is used. The method includes the following specific steps.

5 mill balls with the diameter being 5 mm and 15 mill balls with the diameter being 7 mm are added to a 50 mL zirconia grinding jar; 378 mg of 1,3,5-triformyl phloroglucinol (TP) and 340 mg of melamine (MA) are added to the grinding jar, and well mixed; then 1 mL of a p-toluenesulfonic acid catalyst is added; grinding is performed for 3 h by means of kinetic energy between the mill balls and the grinding jar; then 0.5 mL of water is added to the mixture, and grinding is performed for 5 h; DMF is used for washing for 2 times; then vacuum drying is performed at 60° C.; and TpMA is collected.

2) Method for Preparing Au NPs Loaded COF Material (1) 100 mg of the TpMA (which is prepared by means of ball milling) and 40 mg of $HAuCl_4$ are weighed and placed in a beaker; 10 mL of methanol is added; and stirring is performed for 24 h at room temperature.

(2) A prepared $NaBH_4$ solution (2 mL, 2 mol/L) is added to the above mixed solution; and stirring is continued for 2 h.

(3) Dichloromethane and the methanol are used for washing; vacuum drying is performed (65° C.); and a catalyst (Au@ TpMA) is collected. The partical size of the catalyst Au@TpMA is 3.09±0.75 nm.

Test Example 1 Characterization of Au NPs Loaded COF Material (Au@TpMA)

Figure 6:
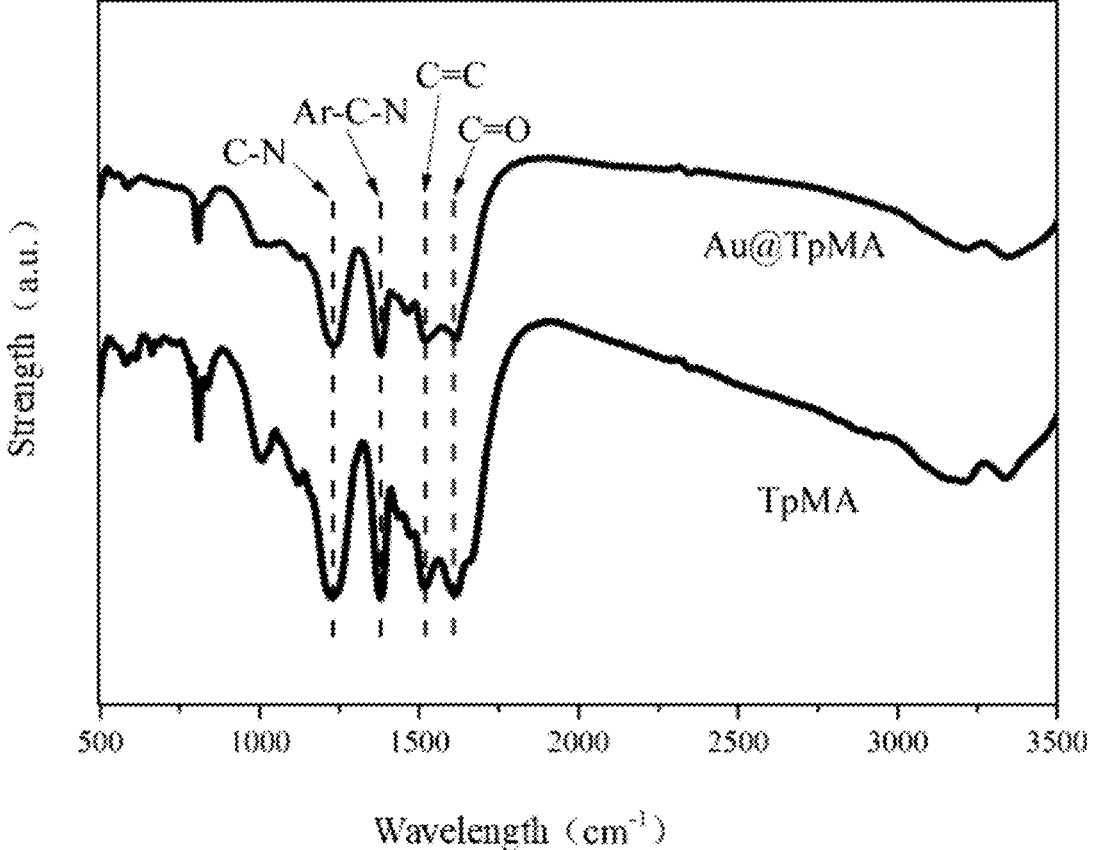
FIG. 6 is XRD patterns of TpMA and Au@TpMA.
Figure 7:
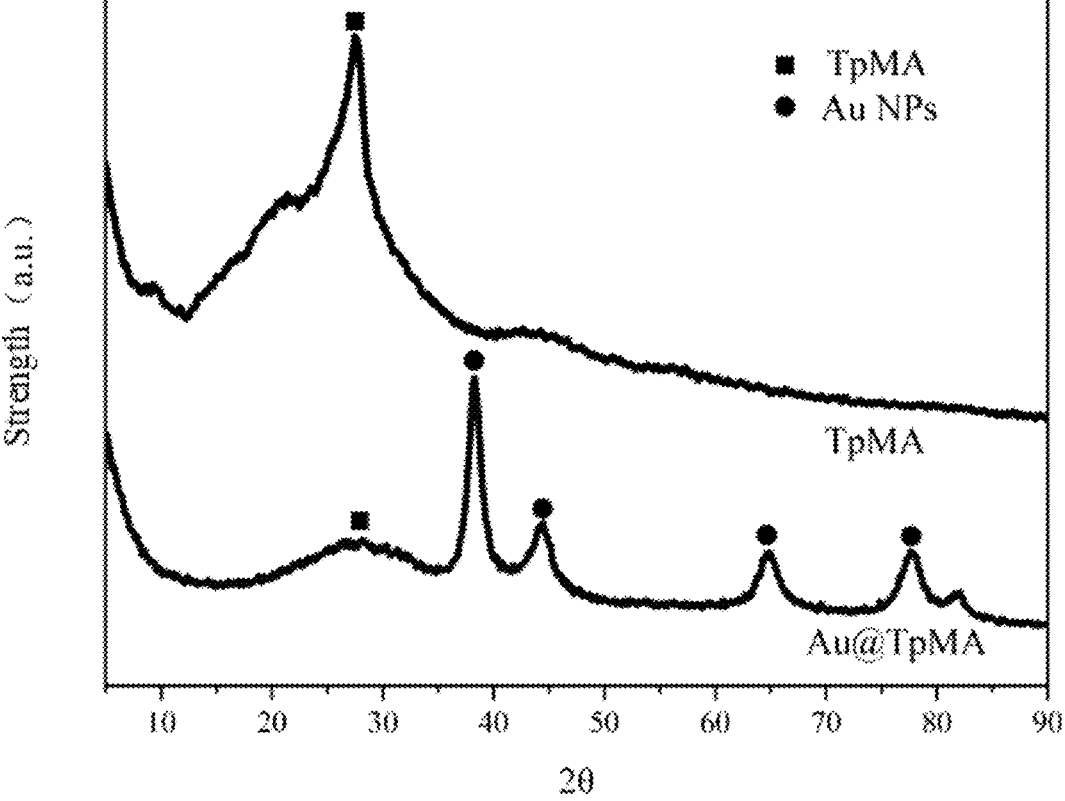
FIG. 7 is a FTIR spectrum of TpMA and Au@TpMA.

The Au NPs loaded COF material (Au@TpMA) prepared in Embodiments 1-5 is characterized. Results are shown in FIGS. 1-5. XRD and FTIR analysis is performed on Embodiment 1. The embedding of Au NPs does not damage the structure of the COF, such that the integrity of the COF material is guaranteed. Results are shown in FIGS. 6-7.

From FIGS. 1-5, it can be seen that, the COF TpMA prepared by means of ball milling is of a crumpled sheet structure, and provides abundant sites for the loading of the Au NPs. The Au NPs are well dispersed on the surface of the TpMA, indicating that the aggregation of the Au NPs is well prevented by means of introduction of the TpMA. The density and partical size of the Au NPs may be adjusted according to the using amount of $HAuCl_4$. When the using amount (10 mg or 20 mg) of the $HAuCl_4$ is relatively low, the density of the Au NPs is low and is distributed relatively uniform. When the using amount (33 mg, 40 mg or 50 mg) of the $HAuCl_4$ is gradually increased, the density of the Au NPs gradually increases, and agglomeration occurs, indicating that the number of the Au NPs that may be loaded by the TpMA is limited, an excess of agglomeration may reduce the catalytic activity of the Au@TpMA. When the using amount of the $HAuCl_4$ is 10-50 mg, the particle sizes and content of the precious metal nanoparticles loaded on the surface of the COF material are effectively balanced, superfine precious metal nanoparticles (<5 nm) are synthesized, and the disadvantages of the nanoparticles highly prone to agglomeration are overcome, such that catalytic performance is greatly improved.

Test Example 2 Study on Catalytic Performance of Precious Metal Nanoparticle Loaded COF Material The catalytic performance of a composite catalyst is evaluated by means of a model response for the catalytic reduction of 4-nitrophenol to 4-aminophenol.

100 µL of 4-nitrophenol ($3.53 \times 10-3$ mol/L), 0.25 mL of $NaBH_4$ and 3 mL of deionized water are successively added to a quartz cuvette, and then 500 µL of an Au@TpMA catalyst (1 mg/mL) is added to trigger a reduction reaction. As the reaction undergoes, the color of the mixed solution gradually changes from yellow to colorless; an ultraviolet visible spectrophotometer is used to monitor the entire reaction process; and an ultraviolet visible spectrum of the mixed solution is determined at specific time points.

Results of a removal rate of the 4-nitrophenol in water pollution are described in Table 1 below.

TABLE 1

| Removal rate of 4-nitrophenol in water pollution | | |
|---|---|---|
| Grouping | Removal rate/% | Removal time/min |
| Embodiment 1 | 100 | 7 |
| Embodiment 2 | 95 | 7 |
| Embodiment 3 | 98 | 7 |
| Embodiment 4 | 96 | 7 |
| Embodiment 5 | 98 | 7 |
| Embodiment 6 | 99 | 7 |
| Comparative example 1 | 91 | 7 |
| Comparative example 2 | 93 | 7 |
| Comparative example 3 | 90 | 7 |

The above are merely the preferred embodiments of the application, and are not intended to limit the scope of the patent for the application. For those skilled in the art, the application may have various modifications and variations. Any modifications, equivalent replacements, improvements and the like made within the spirit and principle of the application all fall within the scope of protection of the patent for the application.

What is claimed is:

1. A method for preparing a precious metal loaded Covalent Organic Framework (COF) composite material catalyst, comprising the following steps:
   (1) mixing TpMA, chloroauric acid ($HAuCl_4$) and methanol; and
   (2) adding sodium borohydride ($NaBH_4$) in a reaction system of step (1) for reaction, so as to obtain the precious metal loaded covalent organic framework composite material catalyst,
   wherein a mass ratio of the TpMA, the $HAuCl_4$ and the methanol in step (1) is 10:1-5:0.5-1.5;
   a ratio of a mass of the $HAuCl_4$ to an amount in moles of the $NaBH_4$ is 1-5 g:0.4 mol; and a concentration of the $NaBH_4$ is 1.5-2.5 mol/L; and
   the TpMA in step (1) is prepared by a process comprising:
   A, first mixing p-toluenesulfonic acid and melamine, and performing grinding for 12-30 min;
   B, then adding 1,3,5-triformyl phloroglucinol into a resulting reaction system of step A, and performing grinding for 2-4 h; and
   C, finally adding 0.1-0.5 mL of water into a reaction system of step B, performing grinding, using DMF for washing for 2-3 times, and performing vacuum drying, so as to obtain the TpMA.

2. The preparation method as claimed in claim 1, further comprising: after mixing in step (1), stirring a resulting mixture at room temperature for more than 20 h.

3. The preparation method as claimed in claim 1, wherein a time for reaction in step (2) is 1-3 h; after the reaction is completed, a resulting reaction mixture is first washed with dichloromethane, then washed with methanol; and finally, vacuum drying is performed at a temperature of 60-70° C., so as to obtained the precious metal loaded COF composite material catalyst.

4. The preparation method as claimed in claim 1, a using amount ratio of the p-toluenesulfonic acid, the melamine and the 1,3,5-triformyl phloroglucinol is 0.5-1.5 mL:320-360 mg:370-390 mg.

5. The preparation method as claimed in claim 1, wherein in step C, a time for grinding is 4-6 h; and the vacuum drying is performed at a temperature of 55-65° C.

* * * * *